United States Patent [19]

Fujigiwa et al.

[11] Patent Number: 4,598,879
[45] Date of Patent: Jul. 8, 1986

[54] DRAG MECHANISM FOR A SPINNING REEL

[75] Inventors: Chikara Fujigiwa, Naganoke; Minoru Sasabe, Naganoken, both of Japan

[73] Assignee: Matsuo Kogyo Co., Ltd., Naganaten, Japan

[21] Appl. No.: 412,379

[22] Filed: Aug. 27, 1982

Related U.S. Application Data

[63] Continuation of Ser. No. 148,278, May 9, 1980, abandoned.

[51] Int. Cl.$^4$ ............................................. A01K 89/02
[52] U.S. Cl. ........................ 242/84.5 R; 242/84.51 A
[58] Field of Search ............... 242/84.51 A, 84.51 R, 242/84.5 A, 84.5 R, 84.21 R, 84.21 A, 84.2 A, 84.2 R, 84.2 G, 84.5 P

[56] References Cited

U.S. PATENT DOCUMENTS

| | | | |
|---|---|---|---|
| 2,059,765 | 11/1936 | Adams | 242/84.51 |
| 2,676,769 | 4/1954 | Sarah | 242/84.21 R |
| 2,863,617 | 12/1958 | Chapin et al. | 242/84.21 R |
| 3,120,357 | 2/1964 | Wood, Jr. | 242/84.5 R |
| 4,200,248 | 4/1980 | Puryear | 242/84.51 A |

FOREIGN PATENT DOCUMENTS 619459  3/1949  United Kingdom ......... 242/84.21 R Primary Examiner—Billy S. Taylor
Attorney, Agent, or Firm—Birch, Stewart, Kolasch & Birch

[57] ABSTRACT

A drag mechanism for a spinning reel is disclosed positioned parallel to the shaft of the reel. A reel shaft has mounted thereon a reel proper with a spool member positioned on the shaft on one side of the reel proper and a braking mechanism on the other side of the reel proper. A single braking disk is provided which is engaged by the braking mechanism on the outer circular portion thereof. The braking mechanism, in being connected to the disk at an off-axial position with respect to the reel shaft, allows for the braking force, once set, to be maintained constant dependent on neither the reciprocating nor rotating motion of the reel shaft.

2 Claims, 2 Drawing Figures

DRAG MECHANISM FOR A SPINNING REEL

This application is a continuation of copending application Ser. No. 148,278, filed on May 9, 1980, and now abandoned.

BACKGROUND AND SUMMARY OF THE INVENTION

The present invention relates to a drag mechanism for a spinning reel.

Spinning reels are provided with drag mechanisms designed to prevent a fishing string from rupturing under the drag, i.e., the force with which a fish, which has been caught, draws back the string. In conventional drag mechanisms, frictional disks fixed on the reel shaft are alternately incorporated with frictional disks which are so arranged as to be capable of rotating together with the spool, and the degree of contact between the frictional disks, i.e., the braking force, is adjustable by means of an adjusting knob located at the tip of the reel shaft. When a torque over a certain limit is exerted on the spool by the drag, the spool is designed to rotate in the direction for releasing the string. With such conventional reels provided with the adjusting knob at the tip of the reel shaft, when one wants to adjust the braking force in proportion to the drag produced by the fish being caught, the adjusting knob must be operated by inserting the hand between the fishing rod and the string stretched parallel to the rod. The adjusting operation is not only tedious but also difficult to perform smoothly. To eliminate this disadvantage, an improved structure has been developed in which the position of the drag mechanism was changed to the rear of the reel shaft so that the adjusting knob may be operated from the rear end of the reel shaft. With this arrangement, however, the basic structure of the spinning reel makes it impossible to position such a large-diameter knob at the rear of the shaft. To utilize fully the pressing force exerted on each of the multiple frictional disks, the adjusting knob must be rotated with a greated force than when it is located at the tip of the reel shaft, such an operation being difficult to perform while the fishing rod is held. With all of the conventional structures wherein both the adjusting knob and the plural frictional disks are located coaxially with the reel shaft, the braking force, which has been set, is made to change by the movement of the reel shaft.

Accordingly, the object of the present invention is to provide a novel drag mechanism for a spinning reel which is free of the disadvantages found in the prior art conventional products. The mechanism of the present invention is characterized in (1) the conventional use of a plurality of sheets of frictional disks has been revised to the use of a single sheet; (2) the disk is placed on the reel shaft on the side of the reel opposite the spool on the reel shaft in a coupled reciprocating and rotating movement with the spool, i.e., at the rear end of the reel shaft, in such a way that the disk is coupled with the reel shaft, only with respect to its rotating motion; and (3) the disk has a braking mechanism which is capable of exerting adjustable braking forces on the outer circular section of the disk. These structures enable the adjustment of the braking force without the application of a great forces or restriction on the handling space by the string and furthermore allows the braking force, once set, to be maintained unchanged.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A detailed description of the present invention is given with reference to the figures.

Figure 1:
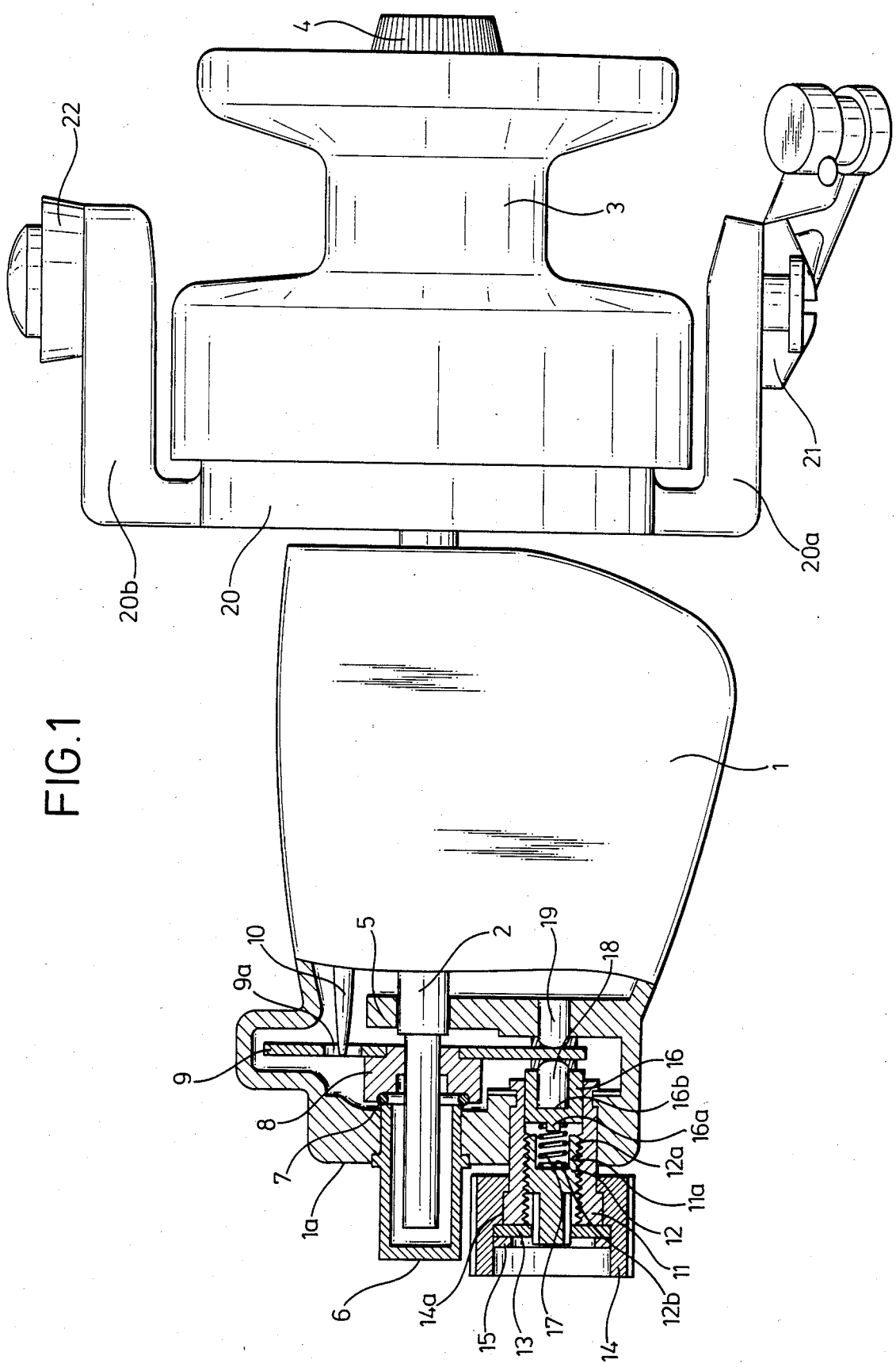
FIG. 1 is an overall lateral view of the spinning reel with a part of the reel being in sections.

In FIG. 1, element 1 is a reel, which supports the reel shaft 2 in such a manner that the shaft is capable of both reciprocating and rotating motions. The reel shaft 2 is provided at its front end, not shown in the figure, with a pin projecting in the axial direction of the reel 1 and also, not shown, with a male engraved thread. Element 3 is a spool through which the above-mentioned male thread of the reel shaft 2 comes out. This spool 3 has a groove (not shown) which catches the above-mentioned pin of the reel shaft 2. At the end of the spool a lock nut 4 is applied to hold the reel shaft 2 by the male thread so that the spool 3 may exhibit either a reciprocating or rotating motion simultaneously with the reel shaft 2. The other rear end of the reel shaft 2 penetrates the projected wall 5 in the reel proper 1 so as to be able to either reciprocate or rotate. The reel shaft 2 extends into the holding cylinder 6 attached to the front wall 1a of the reel proper 1.

Figure 2:
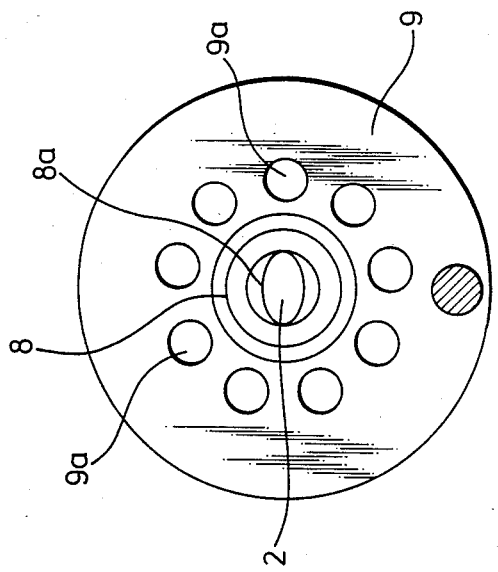
FIG. 2 is a front view, seen from behind the reel proper, for illustrating the detail of the positional relationship between the collar and the reel shaft.

On the front end of the holding cylinder 6 there is affixed a thrust bearing 7, which is fixed to the collar 8 such that the collar may rotate freely. As is seen from FIG. 2, the collar 8 has a non-circular, e.g., elliptical, hole 8a. The section of the reel shaft 2 which moves back and forth through the hole 8a has an elliptical cross-sectional fitting to the hole 8a. Therefore, both the reel shaft 2 and the collar 8 are independent of each other with respect to the reciprocating motion of the shaft itself. But with respect to its rotating motion, both are coupled with respect to each other. Element 9 is a disk, which is placed tightly on the circular projected section of the collar 8. Element 9 has nine holes 9a provided in a circle with equal distances therebetween. Element 10 is a click nail, which is fixed on the reel proper 1 with a screw so that its tip is positioned within the hole 9a. Rotation of the disk 9 will cause the click nail to travel on the holes 9a, one by one, with clicks being made against the holes. It should be noted that the motion of the click mechanism is not always related to the disk 9.

Element 11 is a cylinder which is positioned below the holding cylinder 6 and is attached to the wall 1a of the reel proper so as to project slightly into the reel proper. This cylinder has a female thread 11a on its inner wall in the section remote from the disk 9. Element 12 is a movable element having on its outer surface at one end a male thread 12a which is adapted to fit with the female thread 11a. This movable element 12 has a dent 12b on one end and on the opposite end has a non-circular, e.g., elliptical, cross-section. Element 13 is a washer with an elliptical hole fitting to the corresponding end section of the movable element 12 and capable of being in coupled motion with the movable element 12, only with respect to a rotating motion. Element 14 is an adjusting knob fitting to the cylinder 11, with a capability of free rotation. With its circular stepped section 14a, the washer 13 is brought in contact under pressure by the ring 15. Therefore, when this adjusting knob 14 is rotated, the washer 13 is also rotated and in turn the movable piece 12 is caused to rotate. This movable element 12 has its male thread 12a fitting to the female thread 11a of the cylinder 11 and is independent of the washer 13 with respect to movement in its axial direction. Hence only the movable element 12 is allowed to move back and forth in a direction to and from the disk 9. Element 16 is a holding element which is put in the nonthreaded section of the cylinder 11, with a capability of free sliding. Facing the movable element 12 there is a projection 16a, which is provided to hold one end of a coil spring 17 to be described below. This holding piece 16 has a dent 16b on the side facing the disk 9. Between the holding piece 16 and the dent 12b of the movable element 12 there is disposed a coil spring 17 inserted so as to push the holding element 16 toward the disk 9. Element 18 is a conical brake-shoe made of synthetic resin tightly inserted into the dent 16b of the holding piece 16. This brake shoe is in contact with the outer circular section of the disk 9 under pressure by the coil spring 17. Element 19 is another brake shoe similar to the brake shoe 18, which is fixed in the projected wall 5 so that the disk is placed between these two brake shoes. These two brake shoes 18 and 19 exert a braking force on the disk. This braking effect is increased as the contact position between the brake shoes 18 and 19 shifts further from the disk center and as the contact area of the brake shoes is decreased. The braking mechanism is composed of the adjusting knob 14, washer 13, ring 15, movable piece 12, cylinder 11, coil spring 17, holding piece 16, and a pair of brake shoes 18 and 19.

Element 20 is a rotor which is rotated by a handle, not shown in the figure, and projects from the reel proper 1. Elements 21 and 22 are bail hinges provided on the arms 20a and 20b of the rotor 20, respectively, each of the bail hinges 21 and 22 being provided, though not shown, with a bail, both ends of which are supported. Each of these constituent elements has the same structure and function as those of conventional products.

The structure of an example product of the present invention has been described in detail. The pushing force of the coil spring 17 may be adjusted by rotating the adjusting knob 14 to cause the movable element 12 to move back or forth. A change in the pushing force of the coil spring 17 results in a change in the force, or braking force, with which the pair of brake shoes 18 and 19 elastically press the disk 9. Such a sequence permits the adjustment of the braking force to be exerted on the disk 9. When this braking force exceeds the drag force, the drag force which is exerted on the spool 3 in its rotational direction cannot cause the reel shaft 2 to rotate. Thus, the spool 3 is prevented from rotating and the reel shaft 2 is permitted to move only in the axial direction. To the contrary, however, when the drag force exceeds the braking force, the reel shaft 2 together with the collar 8 and the disk 9, is caused to rotate with the simultaneous rotation of the spool 3, which results in releasing the wound string and preventing the rupture of the string.

The present invention has the following advantages: (1) even in the case where the braking force needs to be adjusted after a fish is caught on the string, the adjusting knob of the braking mechanism may be easily operated without having its operating space restricted by the string; the reason for this is that the adjusting knob is accessible from the rear end of the reel proper; (2) since the braking mechanism is connected to only one disk and exerts the braking force on the outer circular section of the disk, the adjusting knob, though small in diameter, is capable of facilitating an increase in braking force without applying a strong force for its adjustment; (3) since the braking mechanism is connected to the disk at an off-axial position with respect to the reel shaft, and the disk is composed of one sheet, the braking force, once set, is maintained constant dependent on neither the reciprocating nor rotating motion of the reel shaft; (4) since, as in the above-described example application, the pressing force is exerted on the brake shoe via the elastic force of the coil spring, a wide range of adjustments of the braking force is available and this same effect is also obtainable by the use of elastic materials, such as rubber.

In the above description, a conical brake shoe has been adopted as having the best form, but the present invention may, of course, use other forms of brake shoes, e.g., those having a cylindrical form. In addition, it goes without saying that the structure of the products from the present invention is not limited to that of the above example, but a variety of variations in structure is available within the scope conforming to the spirit of the present invention.

What is claimed:

1. A spinning reel having a drag mechanism adapted thereto comprising in combination:

a reel shaft having mounted thereon a reel proper having first and second ends with a click nail fixed to said second end of said reel proper and a spool member mounted on said reel shaft on said first end of said reel proper;

a collar means fitted about said reel shaft on said second end of said reel proper so as to rotate with said reel shaft;

a single braking disk mounted on said collar means and provided with a series of holes at equal distances about the periphery of said disk such that said holes are engaged by said click nail whereby said disk rotates with said reel shaft;

means for coupling said disk with said spool member so that said spool member reciprocates relative to but rotates with said disk, and a braking mechanism positioned parallel to said reel shaft beneath said collar means, said braking mechanism comprising in working relationship a cylinder attached to said second side of said reel proper threaded on an inner wall thereof with a short unthreaded portion of a side of said cylinder facing said disk for receiving a holding element having a recess therein facing said disk, an axially movable element threaded on the outer surface thereof for engaging said threaded portion of said cylinder, said movable element having a recess on the disk side thereof for receiving a coil spring interpositioned between said axially movable element and said holding element capable of pressuring said holding element toward said disk, a brake shoe tightly inserted into the recess of said holding element for engaging said disk at the outer extremity thereof in response to pressure from said coil spring and a freely rotatable adjusting knob fitted to said cylinder whereby pressure force applied on said coil spring by said adjustable knob causes said axially movable element to move back and forth.

2. The spinning reel of claim 1, further including a second brake shoe opposite said first brake shoe such that said disk is interpositioned therebetween.

* * * * *